(12) United States Patent
Thompson

(10) Patent No.: US 6,955,013 B2
(45) Date of Patent: Oct. 18, 2005

(54) END CAP LOCKING MECHANISM FOR CONNECTING PRE-CAST CONCRETE STRUCTURES

(76) Inventor: Harry A. Thompson, 2009 Redwood Ave., Wyomissing, PA (US) 19610

(*) Notice: Subject to any disclaimer, the term of this patent is extended or adjusted under 35 U.S.C. 154(b) by 0 days.

(21) Appl. No.: 10/256,052

(22) Filed: Sep. 26, 2002

(65) Prior Publication Data

US 2004/0062601 A1 Apr. 1, 2004

(51) Int. Cl.$^7$ ................................................. E04C 5/08
(52) U.S. Cl. .................. 52/223.1; 52/223.13; 403/403; 220/794; 138/96 R; 138/96 T; 138/89
(58) Field of Search ........................... 52/223.1, 223.13; 403/403; 202/780; 220/794; 285/921, 9.01; 138/96 R, 96 T, 89, 95

(56) References Cited

U.S. PATENT DOCUMENTS

| | | | | | |
|---|---|---|---|---|---|
| 2,309,000 | A | * | 1/1943 | Morrison | 401/61 |
| 3,352,574 | A | * | 11/1967 | Brian | 285/3 |
| 5,289,851 | A | * | 3/1994 | Jorgensen | 138/89 |
| 5,675,956 | A | * | 10/1997 | Nevin | 52/726.1 |
| 5,794,986 | A | * | 8/1998 | Gansel et al. | 285/148.16 |
| 5,954,094 | A | * | 9/1999 | Base | 138/89 |
| 6,003,557 | A | * | 12/1999 | Brelig et al. | 138/89 |
| 6,371,223 | B2 | * | 4/2002 | Wentworth et al. | 175/296 |
| 6,435,567 | B2 | * | 8/2002 | Kikumori et al. | 285/319 |
| 6,470,635 | B2 | * | 10/2002 | Cornwall | 52/220.8 |

* cited by examiner

*Primary Examiner*—Carl D. Friedman
*Assistant Examiner*—Nahid Amiri
(74) *Attorney, Agent, or Firm*—Sanford J. Piltch, Esq.

(57) ABSTRACT

An end cap locking mechanism used to protect attachment means connecting pre-cast concrete structural members from exposure to adverse environmental conditions having an end cap and a connection sleeve, wherein the end cap is inserted into an end of the connection sleeve and engaged therein prohibiting any exposure of the attachment means to precipitation, which if exposed to such, could possibly corrode the attachment means. The position of the end cap is locked when inserted into the end of the connection sleeve by protrusion rings and cooperating recesses within both the end cap and the receiving section of the connection sleeve.

6 Claims, 4 Drawing Sheets

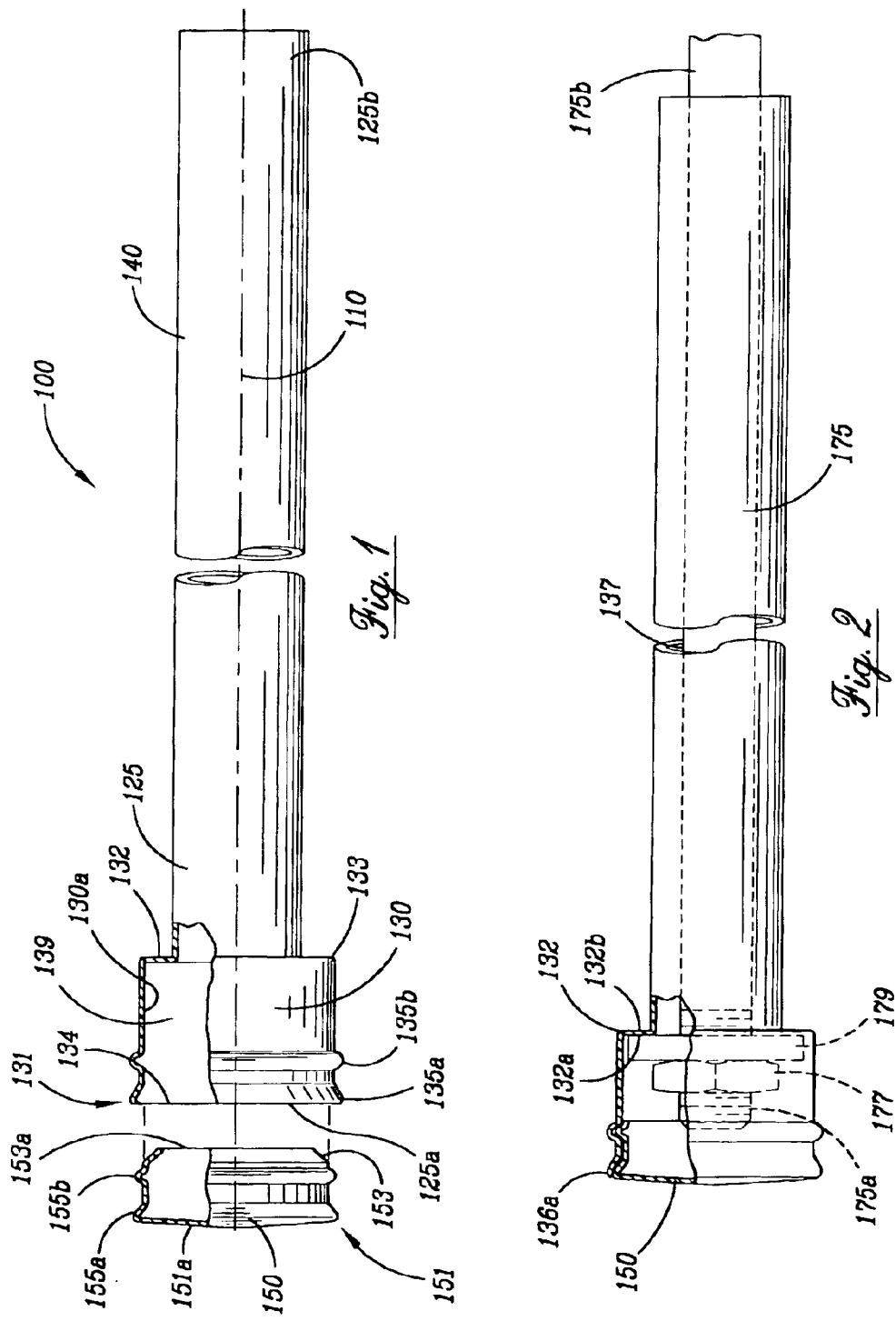

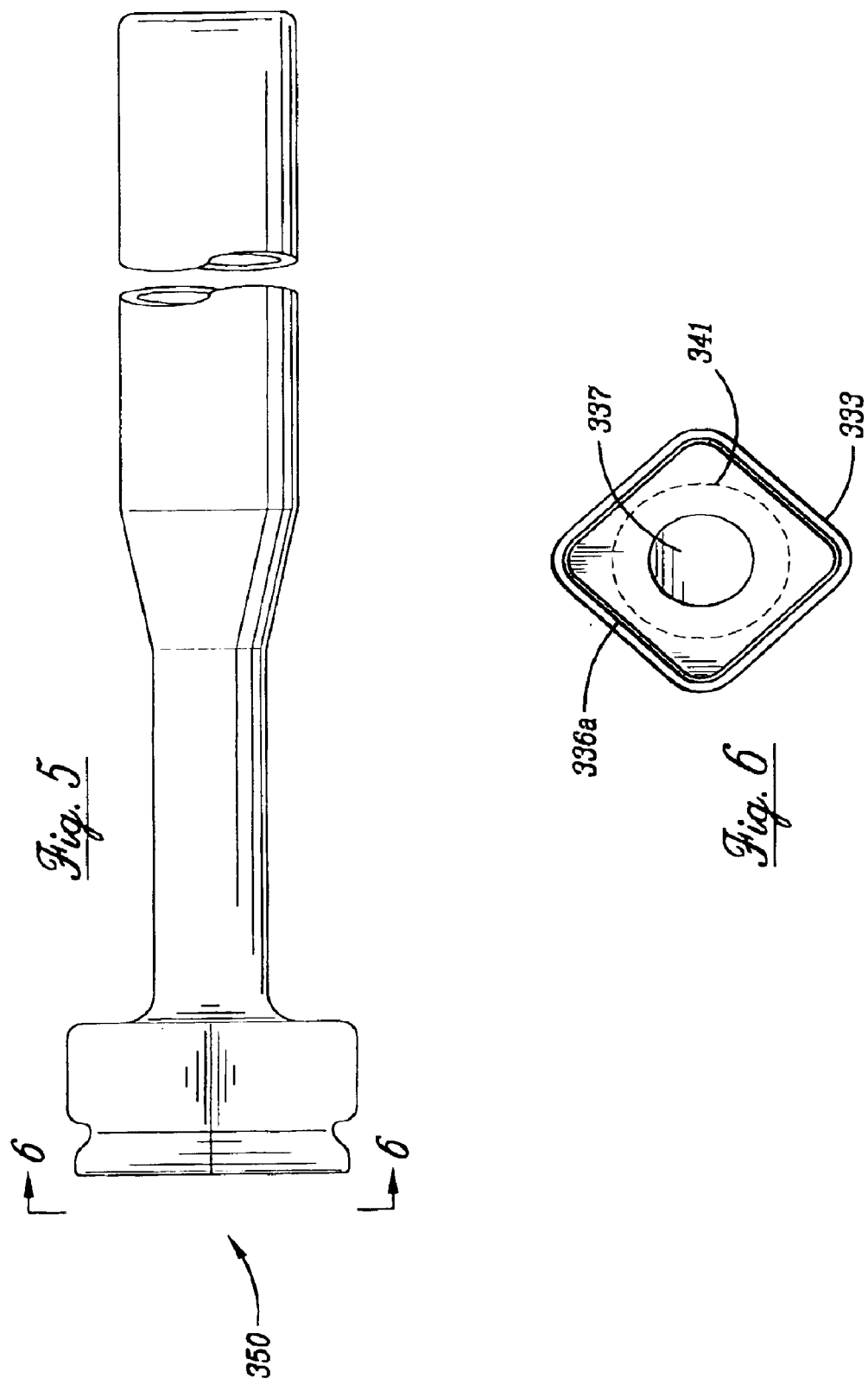

END CAP LOCKING MECHANISM FOR CONNECTING PRE-CAST CONCRETE STRUCTURES

FIELD OF THE INVENTION

The present invention relates to an end cap that locks into an exposed end of a connection sleeve used in pre-cast concrete members. More particularly, the present invention relates to an end cap locking mechanism for covering an exposed end of a connection sleeve wherein the connection sleeve has disposed therein attachment means for connecting to pre-cast concrete structures. The end cap locking member of the present invention prevents direct exposure to environmental conditions, which in turn, corrodes the metal of the attachment means, thereby weakening the strength and integrity thereof and the structure attached therewith. More specifically, the present invention relates to an end cap locking mechanism for covering an exposed end of a connection sleeve housing an attachment means, wherein the end cap engages the connecting sleeve and locks therein. Additionally, the connection sleeve of the present invention is formed in a particular shape and dimension so as to allow the attachment means to be adjusted within a range of motion.

BACKGROUND OF THE INVENTION

With the increasing number of construction projects, pre-cast concrete members are used frequently due to relative ease of installing the members by using cranes to position the members in place as opposed to conventional practices requiring the fabrication of forms and prolonged curing times. Typically, pre-cast concrete members are used to assemble highway overpasses, parking decks and various other projects, wherein horizontal and vertical members such as girders and columns are connected to one another.

Often the girders and columns, have holes disposed therein enabling an attachment means to be inserted therethrough for connecting and orienting the girders and the columns in an orthogonal relationship to one another. Long threaded bolts, and large nuts and washers capable of bearing extremely heavy loads of weight are typical attachment means used to connect pre-cast concrete girders and columns.

Although, the attachment means are initially sufficient in strength to bare the intended weight of the structures, due to the exposure of adverse environmental conditions such as precipitation and wind, the integrity of the attachment means deteriorates as a result of corrosion. To resolve such problems earlier cover members were developed to shield the attachment means from exposure to such adverse conditions, thereby prolonging the life of the attachment means, and thus, the structure.

Although, earlier cover members were capable of shielding the attachment means from the adverse weather conditions, these cover members failed to provide a tight and secure fit for the cover, such that when positioned to cover the attachment means the cover would be permanently locked in place. Thus, there is a need in the art to provide a cover member that tightly and securely attaches to a connection sleeve.

The earlier cover members also failed to provide protection for the attachment means from the weather and to provide a secure fit for covers which could accommodate attachment means that were bent or angled due to the misalignment of holes within the girders and columns. There also exists a need in the field to provide tight and secure fitting end caps within connection sleeves wherein the connection sleeves are capable of accommodating bent and slightly off-set attachment means.

It is therefore, a primary object of the present invention to provide and end cap locking mechanism capable of providing the needed and desired durable permanently locking cover to protect and shield the attachment means within the pre-cast concrete structures.

It is a further object of the present invention to provide an end cap locking mechanism having a connecting sleeve and an end cap that together provide protection of the attachment means from adverse outside weather conditions. It is also an object of the present invention to accommodate attachment means which are bent or angled due to the misalignment of holes within the girders and columns, which otherwise would be incapable of proper attachment, or being protected.

Further objects and features of the present invention will become evident hereinafter.

SUMMARY OF THE INVENTION

The present invention is directed to an end cap locking mechanism used to cover threaded rods connecting pre-cast concrete structures by engaging an end cap into a connection sleeve to assume a locking position and also provide the threaded rod the capability of being adjusted about a range of motion within the connection sleeve of the end cap locking mechanism.

In the preferred embodiment, an end cap locking mechanism of the present invention is used to connect pre-cast concrete structures and comprises an end cap and a connection sleeve, wherein the end cap has a protrusion disposed on and around the circumference thereof. The connection sleeve has an elongated tubular section disposed at one end and a receiving unit disposed at the other end and a recess ring is disposed within and around the circumference of the receiving unit, wherein the protrusion of the end cap engages the recess of the receiving unit, thereby locking the end cap within the receiving unit. The receiving unit has a width larger than the width of the elongated tubular section and upon insertion of the end cap into the receiving unit a surface of the end cap is flush with a surface of one of the pre-cast concrete structures.

Additionally, the end cap locking mechanism of the preferred embodiment of the present invention has a shoulder formed within the receiving unit to support a washer of an attachment means. During tightening of the attachment means, the washer abuts against the shoulder, thereby securing the connecting pre-cast concrete structures together. The present invention is not limited to a single protrusion ring and recess, but preferably an additional protrusion ring disposed on and around the circumference of the end cap and an additional recess disposed within and around the circumference of the receiving unit.

In another embodiment, an end cap locking mechanism of the present invention comprises an end cap and a connection sleeve, wherein the connection sleeve has an expanded tubular section disposed at one end, a receiving unit disposed at the other end and an elongated tubular section disposed therebetween and being of a width smaller than widths of both the expanded tubular section and the receiving unit. A holding member and a washer housing are within the receiving unit, wherein the holding member receives and holds the end cap and the washer housing provides the needed space for a washer to move therein to accommodate for the adjustments of an attachment member, the washer housing having a larger width than that of the holding member. Disposed on and around the circumference of the end cap is a protrusion ring that directly engages a recess disposed within and around the circumference of the holding member, thereby locking the end cap within the receiving member. Additionally, a shoulder is formed within the washer housing enabling the washer to adjustably abut thereagainst. The present invention is not limited to a single protrusion ring and recess, but preferably an additional protrusion ring disposed on and around the circumference of the end cap and an additional recess disposed within and around the circumference of the holding member.

In yet another embodiment, the end cap locking mechanism of the present invention comprises an end cap and a connection sleeve, wherein the end cap has a pair of inwardly tapering protrusions and a v-shaped recess disposed therebetween, wherein a pair of inwardly tapering protrusions and the v-shaped recess are disposed on and around the circumference thereof. The connection sleeve has an expanded tubular section disposed at one end, a receiving unit disposed at the other end and an elongated tubular section disposed therebetween being of a width smaller than widths of the expanded tubular section and the receiving unit. Additionally, the end cap locking mechanism has an inwardly extending protrusion ring disposed within and around the circumference of the receiving unit, wherein the protrusion ring of the receiving unit engages the v-shaped recess of the end cap, thereby locking the end cap within the receiving unit. A shoulder is formed within the receiving unit to support a washer of an attachment means, wherein the shoulder permits the washer to slide and abut against. Furthermore, the receiving unit has a flat section that directly engages one of the inwardly tapering protrusions.

In each embodiment of the present invention, both the end cap and the connection sleeve are each made as unitary bodies and are preferably made from polyethylene and can be manufactured with a variety of dimensional cross-sections such as, but not limited to, rectangular, square, circular and polygonal shapes.

BRIEF DESCRIPTION OF THE DRAWINGS

For the purposes of illustrating the invention, there is shown in the drawings, forms that are presently preferred; it being understood, however, that the invention is not limited to the precise arrangements and instrumentalities shown.

FIG. 1 is an exploded and partially cut-away view of the connection sleeve for pre-cast concrete members showing the end cap locking mechanism of the present invention for receiving the end cap.

FIG. 2 is a partially cut-away view of the connection sleeve for pre-cast concrete members showing the end cap in locking position within the locking mechanism of the present invention and showing a threaded connection rod and bolt assembly in phantom within the sleeve.

FIG. 5 is a side view of the third embodiment of the connection sleeve for pre-cast concrete members with the end cap locking mechanism of the present invention removed therefrom.

FIG. 6 is a top view of the connection sleeve showing the inner surfaces of the connection sleeve of the third embodiment of the present invention.

DETAILED DESCRIPTION OF THE PREFERRED EMBODIMENTS

Figure 3:
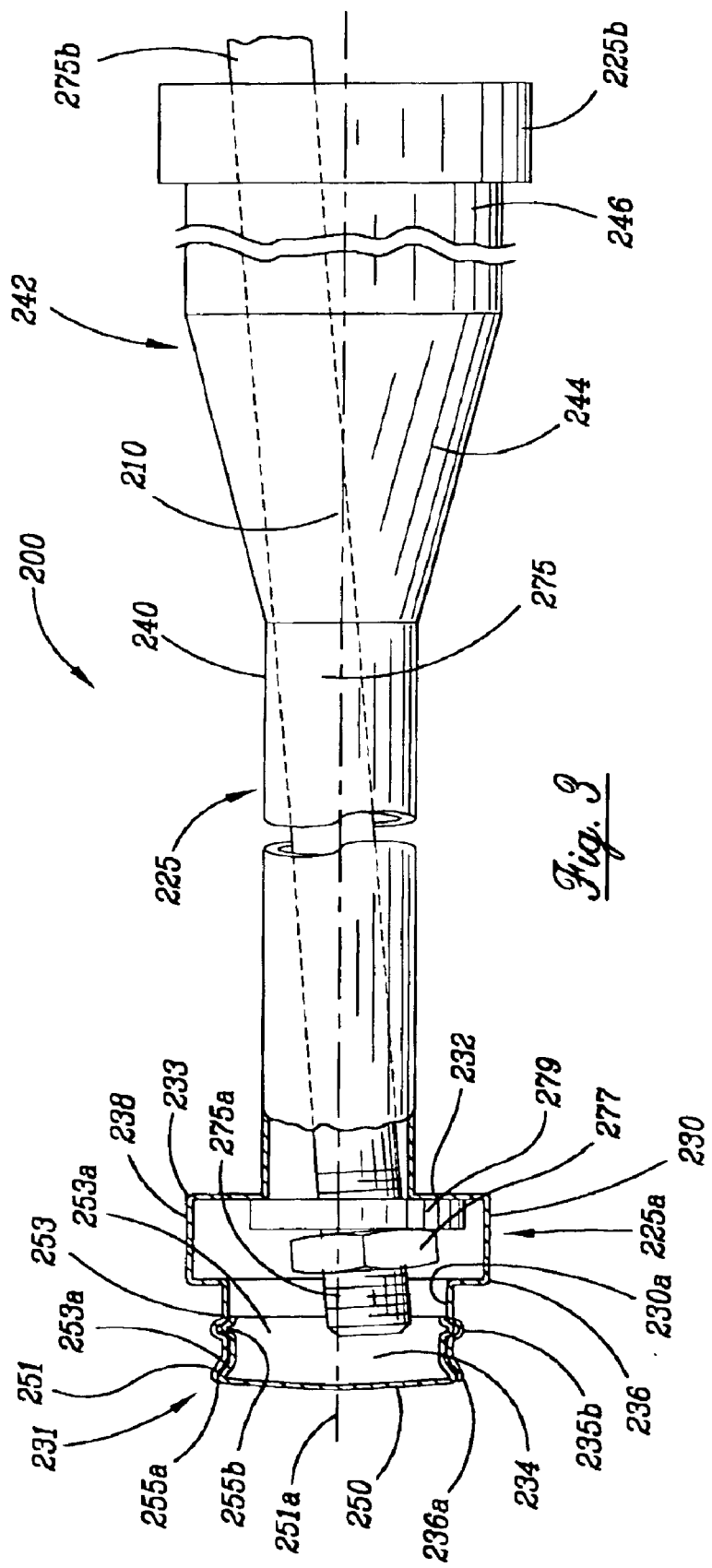
FIG. 3 is a partially cut-away view of a second embodiment of the end cap locking mechanism for connecting pre-cast concrete members showing the end cap in locking position within the locking mechanism of the present invention and showing a threaded connection and bolt assembly in phantom within the sleeve with an expanded segment of the sleeve to accommodate a bent or angled rod.

The following detailed descriptions are for the best presently contemplated modes of carrying out the present invention. These descriptions are not intended in any limiting sense, but rather are made solely for the purposes of illustrating the general principles of the present invention.

Referring now to the drawings in detail, wherein like numerals indicate like elements, there is shown in FIGS. 1 and 2, an end cap locking mechanism 100 having a connection sleeve 125 and an end cap 150 embodying the principles of the present invention. Both the connection sleeve and the end cap can be made integrally through molding processes or separately through conventional plastic welding processes and, as such, each is formed separately as unitary bodies. The connection sleeve 125 is hollow and has a bore axis (not illustrated) extending coaxially through each end thereof. A means for attachment of two pre-cast concrete forms, such as a threaded rod, is received and housed within the connection sleeve 125, wherein the attachment means comprises, but is not limited to, a threaded rod 175, nut 177 and washer 179, as depicted in FIG. 2. Although a threaded rod, nut and washer are the preferred means for attachment of the present invention, other means for attachment are conceivable. Both the connection sleeve 125 and the end cap 150 can be made from various polymers or plastics, but are preferably made from high density polyethylene material having color concentrate and an ultraviolet light inhibitor. The polyethylene material is desirable in that it is of sufficient strength, rigidity and has minimal flexibility, thereby providing a durable barrier for the attachment means.

The present invention is to primarily be used on exterior or outside structures, whereby the entire end cap 150 and possibly part of the connection sleeve 125 will be subjected to environmental conditions, such as constant and direct exposure to ultraviolet light from the sun, as well all forms of precipitation and other weather conditions. The ultraviolet light inhibitor impregnated into the end cap 150 and connection sleeve 125 prevents discoloration and degradation of the end cap and the plastic prohibits any water from seeping through the end cap or connection sleeve. Additionally, the end cap locking mechanism also provides an aesthetically pleasing appearance, by covering the attachment means which, if not covered, would be an eyesore to individuals passing by.

The end cap locking mechanism 100 of the present invention is primarily made of two components, the connection sleeve 125 and the end cap 150, wherein each is made as a unitary body. Located on an end of the connection sleeve, is receiving unit 130, for receiving and firmly holding the end cap 150 in a locking position through an inwardly tapered recess 130a and a semi-circular recess 130b.

Extending from the receiving unit 130 to the other end of the connection sleeve is an elongated tubular section 140. As depicted in FIG. 2, a first interior bore 137 extends through the entire length of the elongated tubular section 140 and a second interior bore 139 extends through the entire length of the receiving unit 130. Both first and second interior bores are coaxial with each other along the bore axis, but are of different diameters or widths. The diameter or width of the second interior bore 139 is significantly larger than that of the first interior bore 137. Forming the two bores with differing diameters creates a number of desirable features.

Firstly, at the transition point along the connection sleeve 125 where the first interior bore is reduced to the second interior bore, a shoulder 132 is formed on a rear wall of the receiving unit 130. Due to relatively enlarged size of the shoulder, sufficient space is provided thereby, to accommodate the washer 179. The shoulder 132 has both an interior and exterior surface, wherein the washer 179 abuts against the interior surface and a surface of the structure being connected (not illustrated) abuts against the exterior surface of the shoulder 132. As such, when the attachment means is tightened, by rotation of the nut 177, the washer 179 and the surface of the structure, sandwiches or squeezes the shoulder 132 therebetween, providing a secure attachment free of exposure to any environmental conditions. Secondly, the second interior bore 139 is of sufficient size not only to accommodate the size of the washer 179 and the nut 177, but also to accommodate the insertion of a standard socket wrench to loosen or tighten the attachment means by engaging the nut 177.

The end cap 150 of the present invention is formed of a unitary body having an opened and closed end 151 and 153, respectively. Located on the exterior surface of the end cap and disposed around the circumference thereof, is a tapered protrusion ring 155a inwardly extending toward the center of the interior bore of the connection sleeve. Also disposed on the exterior surface of the end cap and disposed around the circumference thereof is a semi-circular protrusion ring 155b extending outward from the bore axis. Both the tapered and semi-circular protrusion rings each have respective apices that are of the same diameter or width. Similarly, the tapered and semi-circular recesses 130a and 130b of the receiving unit located on the interior surfaces thereof, are the same diameter or width. Prior to insertion of the end cap 150 into the receiving unit of the connection sleeve, the widths of the protrusion rings on the end caps and the recesses within the receiving unit are the same size.

As illustrated in FIG. 2 of the present invention, after the attachment means has been tightened and secured to hold the attached structures, the end cap 150 is inserted into the receiving unit 130 of the connection sleeve. Since it is desirable to have the end cap fit tightly into the receiving unit, the end cap is forced into engagement with the receiving unit either by hard strikes with an individual's hand or tools such as a rubber mallet or hammer.

Upon insertion of the end cap, the recesses 130a and 130b located on the interior surface of the receiving unit, resiliently and respectively engage the protrusion rings 155a and 155b of the end cap. The semi-circular recess 130b of the receiving unit directly receives and engages the semi-circular protrusion ring of the end cap, wherein the interior surface of the semi-circular recess is forced outwardly and away from the bore axis, thereby slightly displacing the apex of the semi-circular recess away from the bore axis. Likewise, when the tapered recess 130a of the receiving unit directly receives and engages the inwardly tapered protrusion ring of the end cap, the tapered recess is forced outwardly and away from the bore axis, thereby slightly displacing the tapered recess away from the bore axis. Thus, after insertion of the end cap into the receiving unit, the recesses are directly engaged by the protrusion rings, thereby forcing the recesses outwardly causing the resiliency of the receiving unit to respond by providing a contraction force, which firmly and tightly holds the end cap within the receiving unit 130.

The contraction force is established by creating the exterior surfaces of the protrusion rings and the interior walls of the recesses to be the same size, the protrusion rings tightly engage the recesses thereby causing the receiving unit to a small extent, to be forced outwardly away from the bore axis. Due to the rigidity and minimal flexibility of the material, the outward force directed to the receiving unit, conversely compels the walls to contract to re-establish a neutral state, thereby providing an extremely tight fit to not only prohibit wind gusts from disengaging the end cap, but also to seal out any precipitation, as well as preventing any careless removal of the end cap.

Due to the resilient and secure attachment of the end cap to the receiving unit of the connection sleeve, the end cap cannot be removed simply by an individual's hands. Should the need arise, wherein additional adjustment or removal of the attachment member be required, appropriate tools need to be employed to separate the end cap 150 from the receiving unit 130. Although other ways are conceivable for removing the end cap from within the receiving unit, the end cap can preferably be removed without destroying the connection sleeve, by first drilling a hole in the end cap. Upon forming the hole, a rigid rod or hook can be inserted into the hole and be used to pry or pull the end cap from the receiving unit. After adjustments to the attachment member are made, a new end cap can be inserted back into the receiving unit to provide the needed protection from the elements and an aesthetically pleasing appearance.

Although not illustrated, the end cap locking mechanism of the present invention is typically used, but not limited to connecting pre-cast concrete sections wherein one of the surfaces of the sections will be exposed directly to external environmental conditions and/or directly displayed to the public. The surface of the structural concrete member exposed on the outside of the structure must have a hole extending therethrough with similar cross-sectional profile to the connection sleeve 125 so as to enable the insertion of the connection sleeve therein. The shoulder 132 of the receiving unit should abut against the corresponding cross-sectional profile in the pre-cast concrete structural member at such a position such that when the end cap is inserted into the receiving unit of the connection sleeve, the end cap will be flush with the exposed surface of the structure. Additionally, after insertion of the end cap into the receiving unit, any visible appearance of the hole in the pre-cast concrete structural member should have substantially disappeared.

As illustrated in FIG. 3, the second embodiment of the present invention depicts an end cap locking mechanism 200 having a connection sleeve 225 for receiving and housing an attachment member 275. Positioned at one end of the connection sleeve is a receiving unit 230, which resiliently receives and holds an end cap 250. Located at the other end of the connection sleeve is an expanded tubular section 242 for housing and holding the threaded rod 275 wherein the expanded tubular section provides the extra space required to enable the threaded rod 275 to radially move within a limited range of motion about a bore axis of the connection sleeve. Due to the enlarged size of the tubular expanded section, the connection sleeve of the present invention can be used with threaded rods that are bent and/or rods inserted through holes of the connecting structure that are in misalignment.

The end cap 250 of the second embodiment of the present invention is similar to that of the first embodiment, wherein end cap 250 is formed of a unitary body having open and closed ends. Located on the exterior surface of the end cap and disposed around the circumference thereof, is a tapered protrusion ring 255a that extends inwardly toward the center of the end cap. Also disposed on the exterior surface of the end cap and disposed around the circumference thereof is a semi-circular protrusion ring 255b extending outwardly and away from center of the end cap. Both the tapered and semi-circular protrusion rings are each of equal diameter or width. Similarly, tapered and semi-circular recesses 230a and 230b of the receiving unit are located on the interior surfaces thereof, and are also of equal diameter or width. The recesses 230a and 230b as well as the protrusion rings 255a and 255b of the second embodiment of the present invention are similar and engage each other in the same manner as described above in regard to the recesses and protrusion rings of the first embodiment of the present invention.

The receiving unit of the second embodiment of the present invention is different than that of the first embodiment in that receiving unit 230 comprises a holding member 233 and an oversized washer housing 234, wherein the oversized washer housing is larger in diameter or width than that of the holding member 233. The oversized washer housing of the second embodiment of the present invention is larger in size to that of the receiving unit of the first embodiment. Due to the expanded size, the washer 279 is permitted to have a range of motion along a shoulder 232, wherein the washer traverses its range of motion in a direction perpendicular to that of the bore axis. This range of motions enables the use of the present invention in the case where the holes within the connecting pre-cast concrete members are not in alignment, or the threaded rod is bent. As illustrated in FIG. 3, due to the misalignment of the holes within the pre-cast concrete structural members (not illustrated), the threaded rod 275 must be offset from the bore axis at a slight angle, thereby requiring the washer to move transversely to the bore axis to accommodate for the corresponding movement of the threaded rod. The increased diameter or width of the oversized washer housing 234 provides a sufficient range of motion so as to permit the threaded rod to radially fluctuate along the order of ±5 degrees with respect to the bore axis of the connection sleeve.

The connection sleeve of the second embodiment of the present invention is different than that of the first embodiment in that connection sleeve 225 comprises a tubular expanded section 242. When used in conjunction with the oversized washer housing 234, the tubular expanded section provides the necessary enlarged size to accommodate for the radial displacement of the threaded rod 275. As such, when the threaded rod is radially displaced from the bore axis, the washer 279 is also displaced radially from the bore axis. Located along the tubular expanded section are a tapered member 244 and an extension member 246. The tapered member has an interior bore which gradually expands in a direction away from the receiving unit 230 to provide the needed size to accommodate the required range of motion. Although the connection sleeve of the present invention preferably offers a radial range of motion of approximately ±5 degrees with respect to the bore axis of the connection sleeve, the range of motion is not limited to such, since by simple adjustments by increasing the diameter or widths of the washer housing and the tubular expanded section could accommodate for substantially higher degrees of movement.

Figure 4:
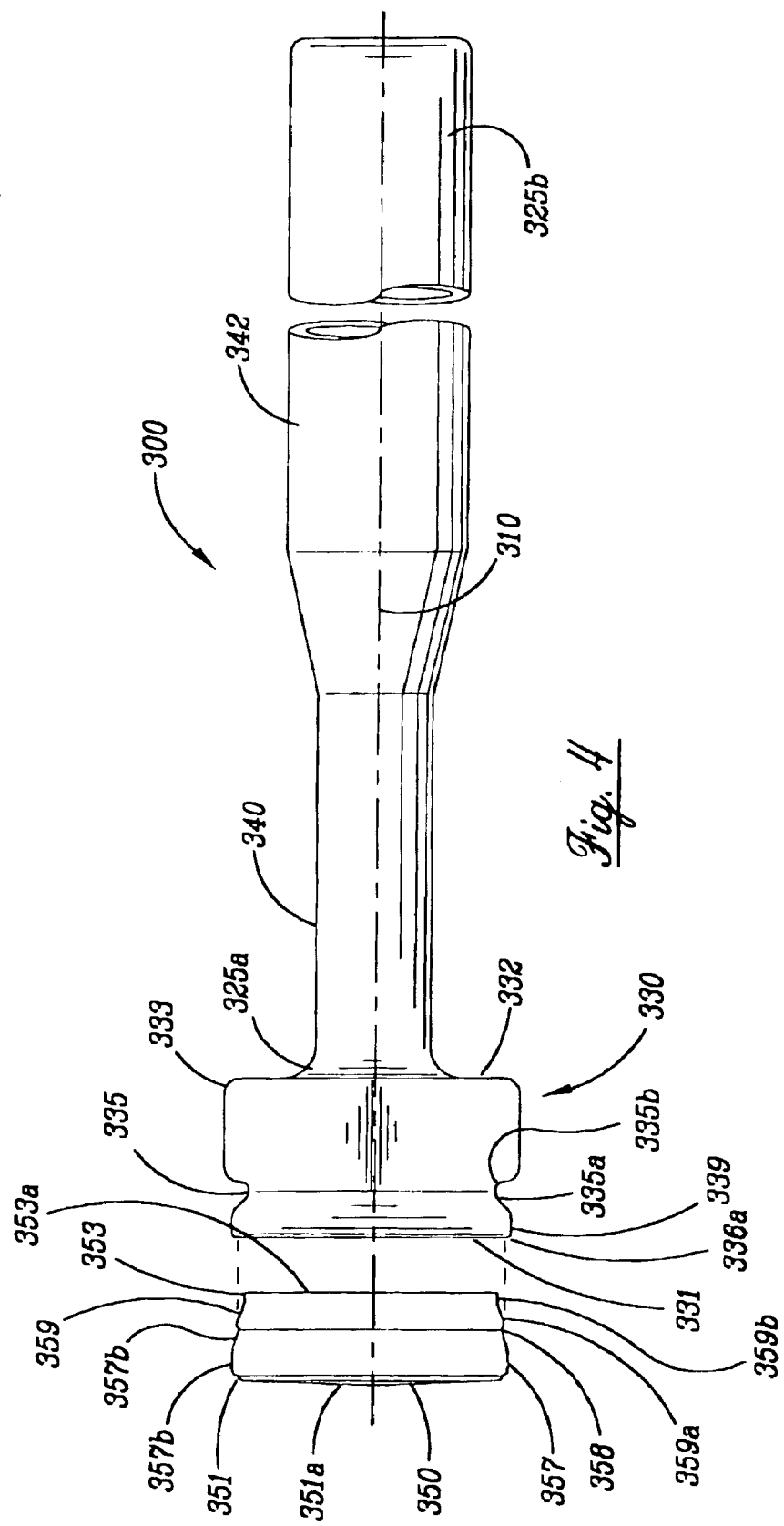
FIG. 4 is a side view of a third embodiment of the connection sleeve for pre-cast concrete members with the end cap locking mechanism of the present invention having a rectangular end cap.

As illustrated in FIGS. 4–6, the third embodiment of the present invention depicts an end cap locking mechanism 300 having a connection sleeve 325 and an end cap 350. Both the connection sleeve and the end cap are formed separately as unitary bodies. Located at one end of the connection sleeve is a tubular expanded segment 342 to permit the threaded rod to radially move about a range of motions so as to enable a user to connect structures wherein the holes in the structure are in misalignment or the threaded rod is bent. Located at the other end of the connection sleeve 325 is a receiving unit 330 similar to the first and second embodiments of the present invention in that a shoulder 332 is disposed on a rear wall thereof, but different in that the receiving unit of the third embodiment does not have any recesses therein to resiliently hold the end cap 350, but instead uses an inwardly extending protrusion to engage the end cap. Disposed between the receiving unit and tubular expanded segment, is an elongated tubular segment 340. Similar to that of the second embodiment of the present invention, shoulder 332 of third embodiment of the present invention is of sufficient size so as to accommodate for radial movements of the washer caused be the radial movements of the threaded rod.

The end cap 350 of the present invention frictionally and resiliently engages the receiving unit 330 of the connection sleeve 325. Located and positioned around the circumference of the end cap are first and second tapered protrusions 357 and 359, respectively. As illustrated in FIG. 4, the first tapered protrusion initially is flat and then gradually tapers inwardly until it reaches the second tapered protrusion. At the transition point along the end cap where the first tapered protrusion becomes the second tapered protrusion, a v-shaped recess 358 is formed. Extending outwardly and away from the recess 358 is the second tapered protrusion 359 having an apex adjacent to the recess and a gradual slope extending inwardly and away from the v-shaped recess. As such, both the first and second tapered protrusions of the end cap taper inwardly toward a center of the end cap.

The receiving unit of the present invention has a flat receiving section 333 and an inwardly extending arcuate protrusion 331. The flat receiving section is of the same cross-sectional profile as that of the first tapered protrusion 357 of the end cap. Similar to the other embodiments of the present invention, prior to inserting the end cap into the receiving unit, the exterior surface of the v-shaped recess 358 is the same diameter or width as the apex of the interior surface of the inwardly extending arcuate protrusion 331 of the receiving unit. Likewise, the interior surface of the flat receiving section 333 is also the same diameter or width as the exterior surface of the first tapered protrusion 357. Whereupon insertion of the end cap into the receiving unit, the apex of the inwardly extending arcuate protrusion actively engages the v-shaped recess of the end cap and the first tapered protrusion 357 of the end cap actively engages the flat receiving section 333 of the receiving unit, thereby creating a resilient and frictionally secure hold. After insertion of the end cap into the receiving unit, the arcuate protrusion 331 directly engages the v-shaped recess 358 and the first tapered protrusion 357 directly engages the flat receiving section 333, thereby forcing the arcuate protrusion 331 and the flat receiving section 333 outward, which causes the resiliency of the receiving unit to directly respond by providing a contraction force which firmly and tightly holds the end cap 350 within the receiving unit 330.

FIG. 6 illustrates an end view of the connection sleeve 325 of the third embodiment of the present invention depicting the inner surfaces thereof. As shown through this illustration, a first interior bore 337 of the elongated tubular segment 340 can be seen, which extends from the shoulder 332 of the receiving unit to the tubular expanded segment 342. A second interior bore 341 axially aligned and corresponding to the bore within the tubular expanded segment 342 of the present invention can also be viewed and has a diameter significantly larger than that of the first interior bore 337 to accommodate for the radial movements of a threaded rod disposed therein. A portion of the receiving unit of the present invention is also illustrated, wherein the flat receiving section 333 and the inwardly extending arcuate protrusion 331 are disposed on and around the circumference of the receiving unit 330, which in turn receives and engages the end cap, thereby establishing a tight and secure end cap locking mechanism of the present invention.

Due to the versatility of the present invention to be used for a variety of the applications, the connection sleeve of the present invention can be constructed in varying lengths and diameters. Preferably, the connection sleeve of the present invention is typically applicable to both small and large applications. For instance, small applications wherein the present invention is used to add fascia to existing exterior walls or uniting step systems to walls, wherein a connection sleeve having a length of approximately 15 inches would be of sufficient length to house and protect the attachment means therein. For larger applications, such as connecting structural pre-cast concrete members to columns in a building or other similar applications dealing with substantial weight, connection sleeves typically along the length of around 30 inches are used to house and protect the attachment means needed to connect structures of such size. The connection sleeves of the present invention range in diameter, but are typically along the order of 1 to 2 inches in diameters for smaller applications and 3 to 5 inches in diameter for larger applications. [At what point, the receiving section or the bore axis? Why not a dimension for each, as well as an overall length dimension?] Although, the receiving unit 330 and the end cap 350 of the present invention in FIG. 6 appear square shaped, other shapes can be used for the end cap and the receiving unit, such as circular, rectangular or polygonal.

It should now be appreciated that the practice of the present invention provides an end cap locking mechanism for attachment means disposed in pre-cast concrete structural members wherein the end cap locking mechanism provides an exceptionally tight and secure fit into a connection sleeve and the connection sleeve is constructed in such a manner so as to accommodate for bent or angled attachment means.

Although the description has been primarily related to pre-cast concrete structural members, the principles of the end cap locking mechanism of the present invention are equally applicable to other materially different types of structures. For instance, the practice of the present invention may very well find application by providing coverage for attachment means connecting wooden and metal structural members. Thus, these other materials are also contemplated to be used with the present invention, and the respective end caps should be of similar color or design to the structure being connected.

The present invention may be embodied in other specific forms without departing from the spirit or essential attributes thereof and, accordingly, the described embodiments are to be considered in all respects as being illustrative and not restrictive, with the scope of the invention as well as all modifications which may fall within a range of equivalency which are also intended to be embraced therein.

What is claimed is:

1. An end cap locking mechanism for connecting pre-cast concrete structures comprising an end cap and a connection sleeve, the end cap having a protrusion disposed on and around the circumference thereof, the connection sleeve has an elongated tubular section disposed at one end and a receiving unit disposed at the other end and a recess ring is disposed within and around the circumference of the receiving unit, wherein the protrusion of the end cap engages the recess of the receiving unit, thereby locking the end cap within the receiving unit, and the receiving unit has a width larger than the width of the elongated tubular section forming a shoulder within the receiving unit to support a washer of an attachment means and upon insertion of the end cap into the receiving unit, a surface of the end cap is flush with a surface of one of the pre-cast concrete structures.

2. The end cap locking mechanism of claim 1, wherein the end cap and the connection sleeve are unitary bodies.

3. The end cap locking mechanism of claim 1, wherein the end cap and the connection sleeve are made from polyethylene.

4. The end cap locking mechanism of claim 1, wherein an additional protrusion ring is disposed on and around the circumference of the end cap and an additional recess is disposed within and around the circumference of the receiving unit.

5. The end cap locking mechanism of claim 4, wherein the connection sleeve includes an expanded tapered section permitting an attachment means within the connection sleeve to have a radial range of motion.

6. The end cap locking mechanism of claim 4, wherein the connection sleeve includes an expanded tapered section and a washer housing within the receiving unit to correspondingly permit an attachment means within the connection sleeve to move within a radial range of motion.

* * * * *